US011861909B2

(12) United States Patent
Jo et al.

(10) Patent No.: US 11,861,909 B2
(45) Date of Patent: Jan. 2, 2024

(54) UNSUPERVISED VIDEO SUMMARIZATION WITH PIECEWISE LINEAR INTERPOLATION

(71) Applicant: INHA University Research and Business Foundation, Incheon (KR)

(72) Inventors: Geun Sik Jo, Incheon (KR); Ui Nyoung Yoon, Gyeonggi-do (KR)

(73) Assignee: INHA University Research and Business Foundation, Incheon (KR)

( * ) Notice: Subject to any disclaimer, the term of this patent is extended or adjusted under 35 U.S.C. 154(b) by 430 days.

(21) Appl. No.: 17/139,021

(22) Filed: Dec. 31, 2020

(65) Prior Publication Data

US 2022/0027633 A1  Jan. 27, 2022

(30) Foreign Application Priority Data

Jul. 24, 2020  (KR) ........................ 10-2020-0092399

(51) Int. Cl.
*G06N 3/08* (2023.01)
*G06V 20/40* (2022.01)
*G06F 17/18* (2006.01)
*G06N 3/084* (2023.01)

(52) U.S. Cl.
CPC .............. *G06V 20/47* (2022.01); *G06F 17/18* (2013.01); *G06N 3/084* (2013.01)

(58) Field of Classification Search
CPC .......... G06N 3/08; G06N 3/084; G06F 17/18; G06V 20/47; G06K 9/00; G06K 9/00751
See application file for complete search history.

(56) References Cited

U.S. PATENT DOCUMENTS 10,459,975 B1 * 10/2019 Malpani ................ G06F 16/735
10,887,640 B2 *  1/2021 Swaminathan .... H04N 21/8549

* cited by examiner

*Primary Examiner* — Tuan H Nguyen
(74) *Attorney, Agent, or Firm* — Hunter E. Webb; Keohane & D'Alessandro, PLLC

(57) ABSTRACT

Aspects of the present invention provide an approach for reinforcement learning for unsupervised video summarization with piecewise linear interpolation. A candidate importance score is anticipated by training a video summarization network using a set of video frames in a video. The candidate importance score is interpolated with respect to other candidate importance scores in the video in order to generate a selection probably for each frame of the video. A video summarization that includes a set of selected frames is generated frame selection probability.

10 Claims, 5 Drawing Sheets

UNSUPERVISED VIDEO SUMMARIZATION WITH PIECEWISE LINEAR INTERPOLATION

TECHNICAL FIELD

The subject matter of this invention relates generally to video summarization. More specifically, aspects of the present invention provide a solution that uses reinforcement learning for unsupervised video summarization with piecewise linear interpolation.

BACKGROUND

As demand for online videos has been increasing exponentially, so has the proliferation of research for video summary, which enables video search at scale and effective video analysis. Using frequent content, newly developed content, and interesting and visually valuable content and the like—it has been suggested to research various methods to summarize video based on keyframe.

Recently, as an explicit Reward Function to select keyframe, Reinforcement Learning (RL) based Unsupervised video summarization has made excellent progress. However, due to high dimensional action space, it is still difficult to produce video summarization naturally by training a summary network using RL. In the case of high dimensional action space, the number of actions to select keyframe in video is too high. As such, due to calculative complication, it is difficult to select an action that guarantees high compensation from so many actions. Therefore, in high dimensional action space, in order to train network using RL, the issue of high variance needs to be addressed.

SUMMARY

To alleviate high-variance and generate natural sequence of summarization frame, an unsupervised summarization network with piecewise linear interpolation is disclosed. In an embodiment, a candidate importance score is anticipated through training of an unsupervised video summarization network using a set of video frames in a video. This candidate importance score is interpolated to generate a selection probability of each frame of the video. Based on the generated selection probability, a set of selected frames can be used to provide a solution in which a video summarization can be generated.

The shortcomings of the prior art are overcome and additional advantages are provided through the provisions, in one aspect, a method. The method comprises anticipating, by a video summarization system, a candidate importance score by training of the video summarization network using a set of video frames in a video; interpolating the candidate importance score with respect to other candidate importance scores in the video in order to generate a selection probability for each frame of the video; and generating a video summarization that includes a set of selected frames based on the generated frame selection probability.

In a further non-exclusive embodiment, the video summarization network is an unsupervised video summarization network with piecewise linear interpolation, the anticipating further includes extracting characteristic information each video frame of the set of video frames using a convolutional neural network trained by image data set, and the extracted characteristic information is used to train the video summarization network.

In a further non-exclusive embodiment, the anticipated candidate of importance score that is interpolated in the importance score of the frame selection probability in the video summarization of the video frame is generated by video summarization network output data.

In a further non-exclusive embodiment, the candidate importance scores are aligned at equal space based on a sequence input size of the video frame, the aligned candidate importance scores are interpolated using piecewise linear interpolation, and the frame selection probability of each frame of the video is generated by applying the piecewise linear interpolation.

In a further non-exclusive embodiment, the generating further includes using, after the importance scores are interpolated, a Bernoulli Distribution in order to select the keyframe, such that the frame selection actions are converted to a frame selection probability, ranging from 0 to 1, wherein the converted frame selection probability therefore selects a frame with probability of 1.

In a further non-exclusive embodiment, the generating further includes At sampling a frame selection action for the frame selection probability which have been converted using the Bernoulli Distribution; evaluating, using a reward function, representativeness of a video summarization generated by the frame selection action of the video frame; acquiring a log probability and a reward function of the video frame action; and summarizing the original video using the video summarization, wherein the reward function includes a representativeness reward as well as a diversity reward, wherein the diversity reward uses characteristic information of the video frame to measure a difference between selected frames; and wherein the representative reward measures a similarity between the characteristic information of the selected frame and other characteristic information corresponding to every frame in the original video.

In a further non-exclusive embodiment, the generating further includes using a reward and a log probability on the frame selection action of the video frame, wherein an objective function is calculated at underappreciated reward.

In a further non-exclusive embodiment, the generating further includes training a parametrized policy-type search strategy to perform a search using an underappreciated reward method as well as policy gradient method.

In a further non-exclusive embodiment, the generating of the video summarization further includes promoting representativeness of the video summarization by revising Reconstruction Loss using random masking to train the video summarization network.

The shortcomings of the prior art are overcome and additional advantages are provided through the provisions, in another aspect, a system. Video summarization system can include a memory medium comprising instructions; a bus coupled to the memory medium; and a processor coupled to the bus that when executing the instructions causes the system to: anticipate a candidate importance score by training of the video summarization network using a set of video frames in a video; interpolate the candidate importance score with respect to other candidate importance scores in the video in order to generate a selection probability for each frame of the video; and generate a video summarization that includes a set of selected frames based on the generated frame selection probability.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

The current embodiments solve these and/or other problems in the current solutions. Through unsupervised video summarization with piecewise linear interpolation, the issue of high variance is alleviated and video summarization is produced naturally. Also, through an unsupervised video summarization network which only needs to anticipate lacking importance scores, learning speed is enhanced and computational complexity is reduced.

Figure 1:
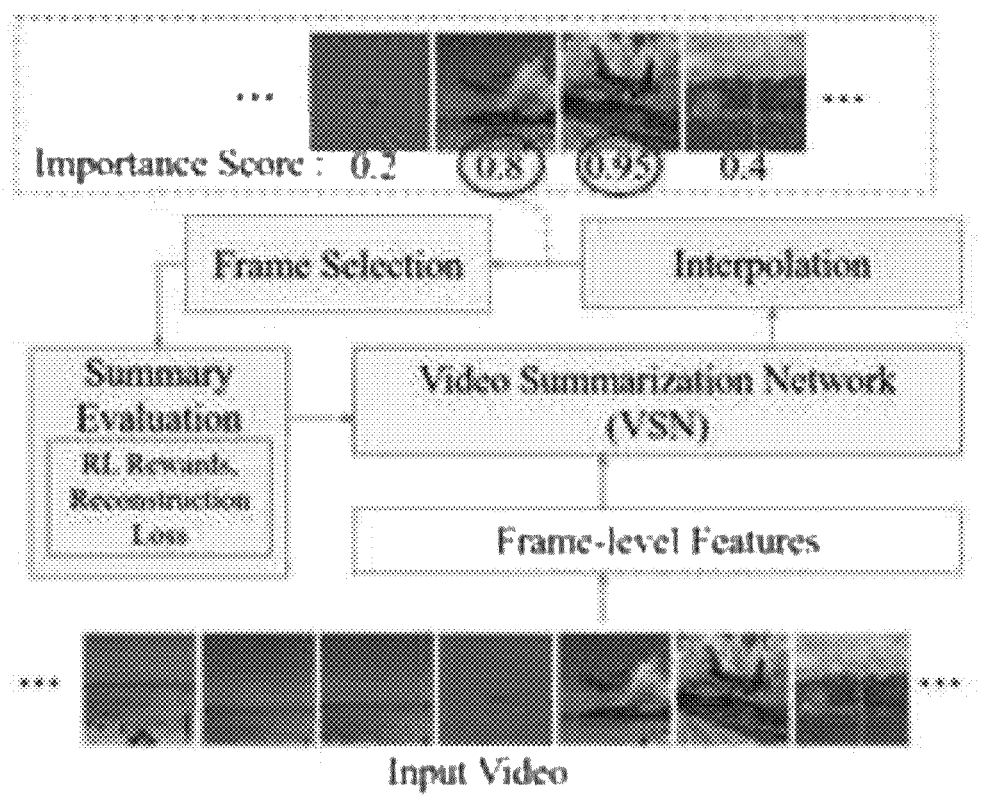
FIG. 1 depicts a process of a video summarization system according to an embodiment of the present invention.

Referring now to FIG. 1, a process of video summarization system is illustrated according to an embodiment of the present invention. As shown, video summarization system selects a keyframe with a high importance score to summarize video based on reinforcement learning. To alleviate high variance and generate a natural sequence of summarized frames, an unsupervised video summarization network applying piecewise linear interpolation is offered. With reference to FIG. 1, a method to select keyframe to summarize video using importance score of the frame is outlined.

Video summarization system can receive video through input data. Video summarization system can use a convolution neural network to extract visual characteristics of video frame images. For example, GoogleNet can be used to extract visual characteristics.

Video summarization system can provide a video summarization network (VSN) based on Linear Attention recurrent Neural Network (LARNN). LARNN can be a multi-head attention variant of LSTM. Video summarization network, in order to learn video expression, uses multi-head attention and one or more LSTM cells to record the recent status. Video summarization network output's last few sequences use Fully Connected Layer and Sigmoid Functions to calculate a set of candidate importance scores. Each candidate importance score can be interpolated on based on the importance score of the video frame.

Particularly, in a high-dimensional action space, various actions may be selected, which changes reward during training. As such, gradient estimate, calculated by log probability of action and reward disperse increasingly. When selecting frame using the interpolated importance score, a nearby frame with a similar score can be selected together, at a high probability. As such, variation of actions can reduce which effectively reduce action space. Referencing diagram 6, a natural sequence of nearby frames with high importance scores can be produced. Also, high variance can be alleviated by reduced action space.

Video summarization system, after interpolating the set of candidate importance scores, can convert each importance score through 0 or 1 frame selection action using a Bernoulli Distribution. Utilizing this action, summarization selects keyframe and then, using a Reward Function, summarization can be evaluated for diversity and representativeness. After this, using reward and log probability of action to calculate objective function offered in UREX (underappreciated reward). Lastly, it is possible to calculate reconstruction loss, modified to enhance summarization's representativeness.

Video summarization system, in order to alleviate high-variance and tp produce a natural sequence of summarization frames, offers an unsupervised video summarization network with piecewise linear interpolation. As such, the unsupervised video network's output layer's size can be reduced. Also, the unsupervised video summarization network only needs to anticipate the lacking importance score which enables faster learning by the network.

Video summarization system, in order to promote summarization's representativeness, can offer reconstruction loss modified by random masking.

Video summarization system, in order to enhance outcome, can adopt underappreciated reward search.

Figure 2:
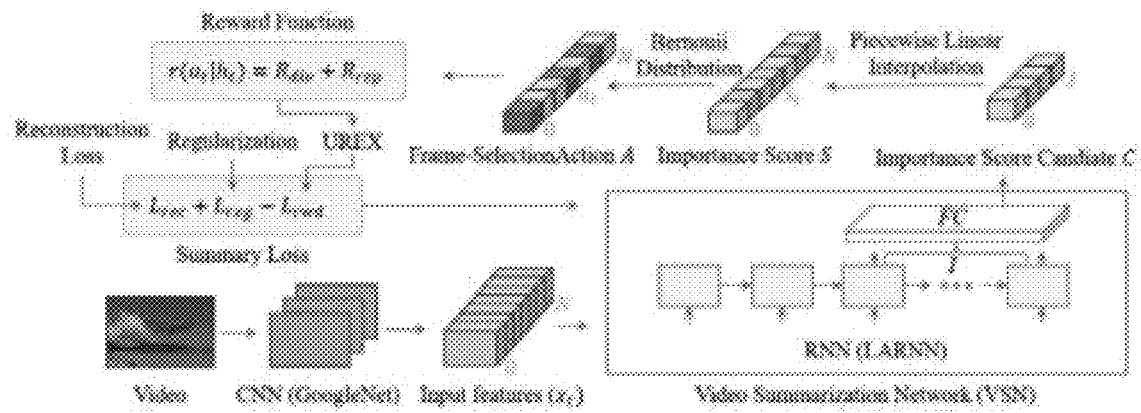
FIG. 2 depicts a video summarization network within the video summarization system according to an embodiment of the present invention.
Figure 3:
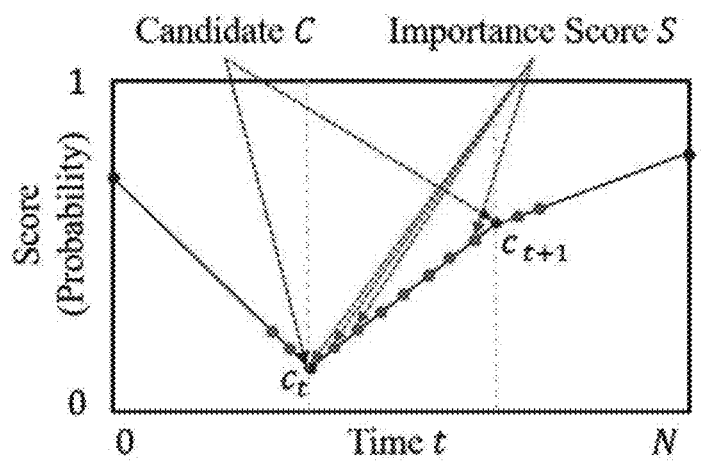
FIG. 3 depicts a process for storing candidate importance scores to the importance score using piecewise linear interpolation within video summarization system according to an embodiment of the present invention.

Referring now to FIG. 2, a video summarization network within video summarization system is depicted according to an embodiment of the present invention. As illustrated in FIG. 2, a video summarization framework based on piecewise linear interpolation is shown. Video summarization network can be trained to anticipate a set of candidate importance scores using the video's frame-level features. This candidate importance score can be interpolated as an importance score to allow summarization to select a frame. A reward function can calculate reward from each frame's selected action. An underappreciated reward's function can be calculated as reward to learn accumulative reward maximization. Output of the reward function, reconstruction loss and regularization loss can be summarized as a summary loss.

Video summarization system can formulate video summarization with respect to frame selection of the importance score trained by the summarization network. In order to each anticipate candidate importance score which is to be interpolated in importance score, system can offer a parametrized policy like video summarization network with piecewise linear interpolation. In other words, importance score means frame selection probability. Similar to diagram 2, the Bernoulli distribution is used to convert importance score of frame selection action to select keyframe.

Video summarization system can use GoogleNet, which is a Convolution Neural Network trained by ImageNet dataset, in order to extract visual features $\{x_t\}_{t=1}^N$ of video frames. Extracted feature info is used to explain visual explanation of frame and to capture a visual difference between frames. As described in diagram 2, in order to train the video summarization network, sequence of frame-level features can be input. Video summarization network can be LARNN. LARNN is a variation of LSTM network, using batch normalized as well as hidden LSTM cell and multi-head attention mechanism. Batch normalized speeds up network's training, however in the illustrations, the size of batch is set at 1 which should not affect speed. Multi-head attention maintains the recent cell value, and through Query can gain hidden cell value. Video summarization network, through multi-head attention mechanism and LSTM cell, can learn a video's expression and the visual differences between frames. Video summarization's hidden status $\{h_t\}_{t=1}^{N}$ can train an input function to anticipate each candidate importance score.

Video network's output is importance candidate score $C=\{c_t\}_{t=1}^{l}$, interpolated in importance score $S=\{s_t\}_{t=1}^{N}$ which is frame selection probability to be chosen by a video summarization. Within the output length l last step's sequence can be selected. Subsequently, a Fully Connected Layer and Sigmoid function can be used to convert multi-dimensional featured Output; candidate importance score can be converted to probability between 0 and 1.

Interpolation is known to predict a new data point within the scope of discrete data point; it is a form of estimation methodology. Video summarization network can align candidate importance scores at equal distance to fit an input size N of a frame sequence. Illustrated in diagram 3, system can interpolate candidate importance score (C) to importance score (S) by using piecewise linear interpolation. This piecewise linear interpolation can connect candidate importance score to a linear line and can calculate a medium value. Video summarization system, after interpolation, can achieve an importance score for each frame of the video, that is, a frame selection probability.

Video summarization system reduces calculation complexity of video summarization network and offers interpolation to increase the network's learning. Video summarization network only needs to estimate a particular candidate importance score's length l, and not all of the sequence. Interpolation alleviates high-variance and promotes natural sequence of summarization frames. Particularly, in a high dimensional action space, reward of action can change at different phases. This is because when selecting a frame, a Bernoulli distribution is used. Therefore, the Gradient Estimate, calculated by Reward, can increasingly disperse. At this time, when a frame is selected using the interpolated importance score, a nearby frame with a similar score can be selected as well, as illustrated in Diagram 6.

Video summarization system, after interpolating, can take importance score (S), and through frame selection action $A=\{a_t|a_t \in \{0,1\}, t=1, \ldots N\}$ using a Bernoulli Distribution, and convert a frame selection probability. At each frame, if the frame selection action is similar to example 1, this frame can be selected as one keyframe to summarize the video.

Example 1

$$A \sim \text{Bernoulli}(a_t; s_t) = \begin{cases} s_t, & \text{for } a_t = 1 \\ 1 - s_t, & \text{for } a_t = 0 \end{cases}$$

Video summarization system, in order to evaluate the policy effectively, uses a Bernoulli Distribution for the importance score and can sample the frame selection action. The reward function is used to evaluate quality of summarization variations produced by the frame selection actions due to various episodes; at the end of episode it can obtain the action's log probability and reward. In an illustration, non-patent document 1 suggests using diversity and representative reward function. During training, a combination of values in diversity reward (Rdiv) and representativeness reward (Rrep) can be maximized.

Diversity reward estimates differences between keyframes selected by frame level features. Depending on the reward, a policy can be trained to produce frame selection action to select each keyframe from among the various frames. At this time, in order to prevent Reward Function from calculating a difference in frames that are spaced out from each other, temporal distance can be limited to a pre-determined distance (e.g., to 20). This temporal distance helps to maintain the storyline of the video. This will also reduce computational complexity.

If selected frame's index is $\mathcal{J} = \{i_k | a_{i_k} = 1, k=1, 2, \ldots, |\mathcal{J}|\}$ Diversity the reward can be expressed as the following:

$$R_{div} = \frac{1}{\mathcal{J}(\mathcal{J}-1)} \sum_{t \in \mathcal{J}} \sum_{\substack{t' \in \mathcal{J} \\ t \neq t'}} \left(1 - \frac{x_t^T x_{t'}}{\|x_t\|_2 \|x_{t'}\|_2}\right) \quad \text{Formula 2}$$

Representative reward estimates the similarity between the selected frame level feature and all of the frame level features of the original video and produces a video summarization that represents the original video.

$$R_{rep} = \exp\left(-\frac{1}{N} \sum_{t=1}^{N} \min_{t' \in \mathcal{J}} \|x_t - x_{t'}\|_2\right) \quad \text{Formula 3}$$

To train parametrized policy $\pi_\theta$ which is a video summarization network, search strategy can be used to search the underappreciated reward method as well as a Policy Gradient Method. Policy Gradient Method is a reinforcement learning based on a popular and powerful policy. This parametrized policy is optimized using a reward (accumulative reward) based on a gradient descent mode, such as SGD. Using a Policy Gradient Method increases action-maximized log probability; and can activate by receiving a reward through an action produced by policy. However, the policy gradient method has a few problems, such as low sample effectiveness. An agent, as opposed to a human, requires more samples (experience) to learn an action in an environment (state). Another issue is the estimated gradient's high variance. In our illustration, video summarization network with piecewise linear interpolation is offered to reduce action space and variance.

Under the current policy, if an action's log reward probability underappreciates reward, the action can be further searched under the suggested search strategy.

In order to calculate the objective function, first, the action function's $\pi_\theta(a_t|h_t)$ Log probability log $\pi_\theta(a_t|h_t)$ and episodes J's reward are calculated. $r(a_t|h_t) = R_{div} + R_{rep}$. At the end of the episode, the action's log probability and reward to calculate objective function are maintained. At the equivalent video, the reward due to variations of frame selection actions due to many episodes is calculated and estimate is then calculated. Because the expected value of all of the variations of frame selection actions is hard to calculate in a short period of time, when frame sequence input takes longer, this calculation becomes even more difficult.

$\mathcal{O}_{UREX}$ is an objective function to train video summarization network. Objective function is the sum of the expected reward and $\mathcal{O}_{RAML}$. $\mathcal{O}_{RAML}$ the reward augmentation maximum-likelihood objective function to optimize reward in the traditional technology. At the early stage of training, normalized importance weights can disperse too highly so it can be combined with expected reward. For $\mathcal{O}_{RAML}$ approximate value, J-th action is sampled and, using softmax, a set of normalized importance weights is calculated. τ is a normalized factor to avoid excessive random search.

$$\mathcal{O}_{UREX}(\theta; \tau) = E_{h \sim p(h_t)}\{\sum R(a_t|h_t)\} \quad \text{Formula 4}$$

$$R(a_t|h_t) = \pi_\theta(a_t|h_t) r(a_t|h_t) + \mathcal{O}_{RAML} \quad \text{Formula 5}$$

$$\mathcal{O}_{RAML} = \tau \pi_T^*(a_t|h_t) \log \pi_\theta(a_t|h_t) \quad \text{Formula 6}$$

For a policy gradient, the important method is using standard to reduce variance and computational efficiency is improved. Standard can be an average of movement of all of expressed rewards up to the current point, updated at the end of episode. Standard is sum of each video (Vi) movement average reward $b_1 = 1/ \mathcal{J} \times \Sigma_j^{\mathcal{J}} r[v_i]$ and average of movement average reward $b_2 = 1/v_{all} \times 1/ \mathcal{J} \times \Sigma_{i=1}^{v_{all}} \Sigma_j^{\mathcal{J}} r[v_i]$ Because of using movement average of diverse videos, diversity is enhanced.

$$\mathcal{B}_{0.7 \times b_1 + 0.3 \times b_2} \quad \text{Function 7}$$

$$L_{rwd} = \mathcal{O}_{UREX}(\theta; \tau) - \mathcal{B} \quad \text{Function 8}$$

Video summarization network can be trained as a parametrized policy, with Lrwd maximized based on policy gradient.

Video summarization network can use regularization term Lreg as suggested in non-patent document 1, to control frame selection action. If more frames are selected as keyframes of video summarization, reward will increase based on reward function. Without regularization term, during training to maximize reward, frame selection probability that is interpolated importance score can be maximized to 1 or reduced to 0. In order to avoid overfitting, a value (0.001) is utilized and selected frame percentage can use selection value (0.5)

$$L_{reg} = 0.01 \times \left( \frac{1}{N} \times \sum_1^N s_t - 0.5 \right)^2 \quad \text{Formula 9}$$

To train video summarization network, a summarization's representativeness is promoted by reconstruction loss, modified by random masking. Using importance score (S), input frame level feature Xt is multiplied by score St; at time t frame level feature's representativeness is calculated. At time t, if score is high, time t's frame level function can show the video. In order to prevent score St from being too close to 1; for example, input feature's $x_t^M$ 20% can randomly be masked as 0. D represents input feature (1024) dimensional size that regulates Lrec value, because difference of square of input feature $x_t^M$ and $x_t \times s_t$ may prove to be too large to use.

$$L_{rec} = \frac{1}{D} \times \sum (x_t^M - x_t \times s_t)^2 \quad \text{Function 10}$$

After all of loss functions are calculated, loss Lsummary is calculated and then backpropagated.

$$L_{summary} = L_{reg} + L_{rec} - L_{rwd} \quad \text{Function 11}$$

Video summarization system, in order to test video summarization network, averages frame level importance scores within Shot, which enables shot—level importance score to be calculated. In order to produce main shot within dataset, KTS (Kernel Temporal Segmentation) is used to detect change points like shot boundaries. In order to produce video summarization, video length that meet predefined standard (for example, top 15%), and the main shots pertaining to them can be aligned based on score and then selected. Algorithm 1 is an illustration of training video summary network.

Algorithm 1:

---

Algorithm 1 Training Video Summarization Network.

---

1: Input: frame-level features of video
2: Output: VSN parameter (θ)
3:
4: for number of iterations do
5:     $x_t \leftarrow$ Frame-level features of video
6:     C ← VSN($x_t$) % Generate candidate
7:     S ← Piecewise linear interpolation of C
8:     A ← Bernoulli(S) % Action A from the score S
9:     % Calculate Rewards and Loss using A and S
10:    % Update using policy gradient method:
     +
11:    {θ} ← −∇($L_{reg}$ + $l_{rec}$ − $L_{rwd}$) % Minimization
12: end for

---

Figure 4:
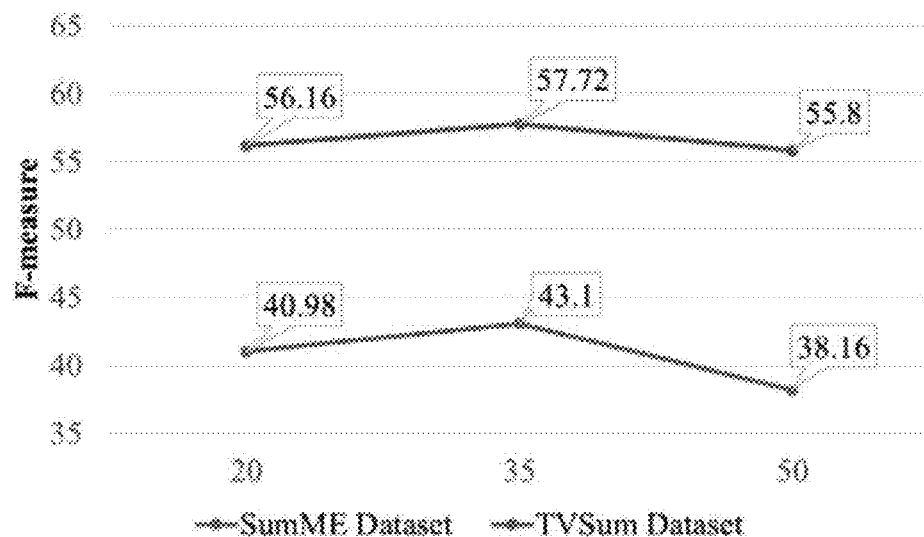
FIG. 4 depicts a graph to display result of candidate importance scores stored in importance score in Dataset in video summarization system according to an embodiment of the present invention.

Referring now to FIG. 4, a result of candidate importance score size, interpolated in importance score of dataset, within video summarization system is depicted according to the invention. For example, SumMe as well as TVSum dataset can be used, and if candidate importance score size is set to 35, network shows optimal performance within two datasets.

Figure 5:
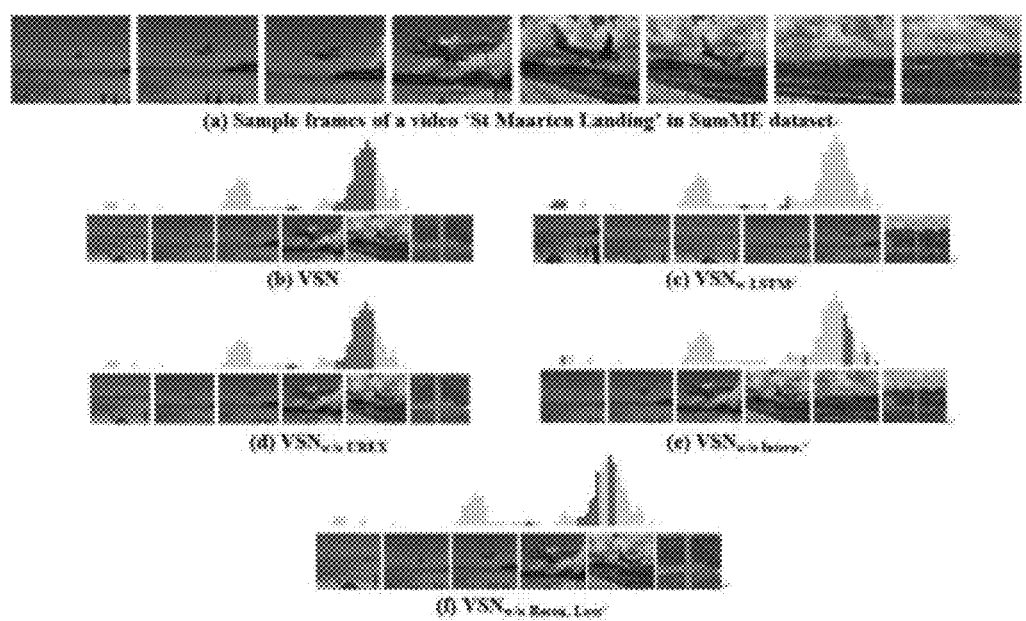
FIG. 5 depicts a visualization of importance score of sample image and frame, selected by video summarization system according to an embodiment of the present invention.

Referring now to FIG. 5, a visualization of a sample image and frame's importance score, selected by video summarization system, is depicted according to the invention. As illustrated, SumMe dataset's video "St Maarten Landing" is summarized as the selected sample image as well as frame's importance score are visualized. Gray bar is an actual importance score, red bar is the selected frame from the invention. Keyframe is properly selected to gain the highest importance score, by the video summarization network. Video summarization network without underappreciated method selects the video's main contents, similar to video summarization network; video summarization network without reconstruction loss, because it lacks process to calculate representativeness, a frame with a high importance score can be less selected. Representativeness calculation is done by summation of the selected frame feature with an anticipated importance score and the difference of original frame feature due to reconstruction loss. Video summarization network using LSTM can result in the network not being sufficiently trained.

Figure 6:
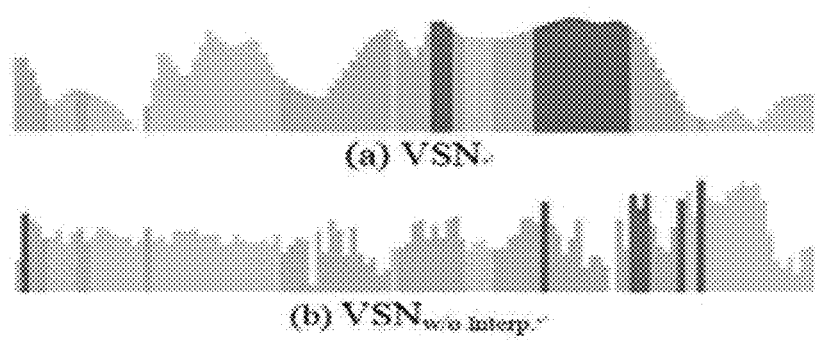
FIG. 6 depicts a comparison of interpolated and uninterpolated networks in video summarization system according to an embodiment of the present invention.

Referring now to FIG. 6, a difference between an uninterpolated network and an interpolated network within video summarization system is depicted according to the invention. Referring to FIG. 6(b), if piecewise linear interpolation is not applied, within video's main contents, one can find differing importance scores of adjacent frames. As such, it is difficult to select nearby frames from the frame with high scores. With respect to diagram 6(a), because adjacent frames share similar scores, an adjacent frame from a keyframe anticipated with a high score, can be selected. This is a strength of interpolation, where while keyframe selection training is going on, the relationship between adjacent frames can be maintained. Also, based on interpolation, a natural sequence of summarization frames is made possible, compared to the network without interpolation; a keyframe of main contents can be selected.

Figure 7:
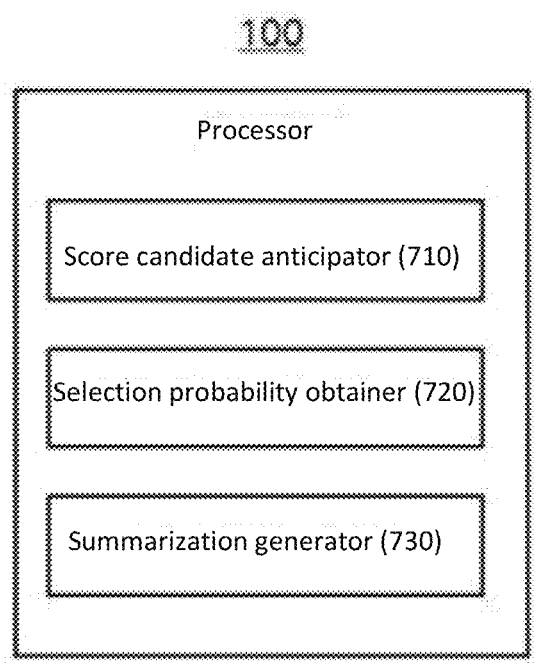
FIG. 7 depicts a block diagram to explain composition of video summarization system according to an embodiment of the present invention.
Figure 8:
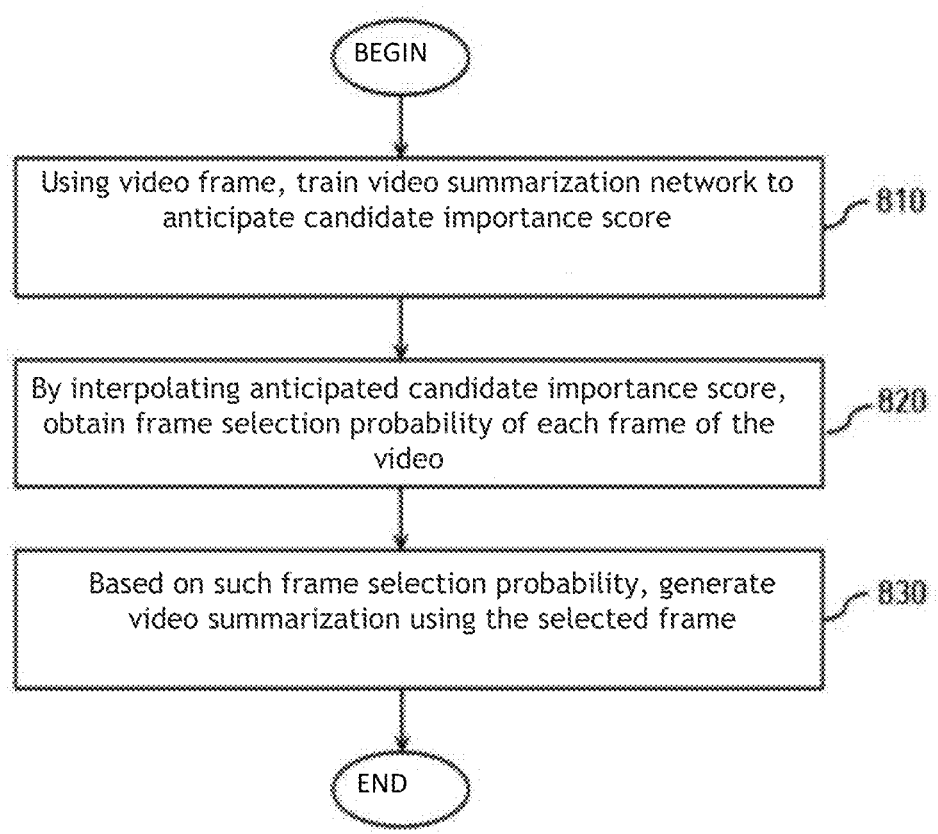
FIG. 8 depicts a flowchart to explain video summarization method within the video summarization system according to an embodiment of the present invention.

Referring now to FIG. 7, a block view to explain components of video summarization system is depicted according to an embodiment of the invention. Referring additionally to FIG. 8 a flowchart of a video summarization method within video summarization system is depicted according to the invention. As illustrated, Video summarization system (100) processor can include importance score anticipator (710), selection probability obtainer (720) as well summarization generator (730). Components of the processor are expressions of different functions executed by processor based on commands by programming codes stored in video summarization system. Processor as well as processing components can control video summarization system in such a way to execute steps (810 thru 830) included in video summarization method as prescribed in diagram 8. At this time, processor as well as processing components are designed to execute instructions of operating system's code included in memory and of at least one of program's code.

Processor can load program code, saved in program file for video summarization method, to Memory. For example, when program is executed in video summarization system, based on operating system's control, processor can control video summarization system to load program code to memory, from program file. At this time, processor as well as anticipator (710), obtainer (720) and generator (730) included in processor can each execute instructions which correspond to portions of program code loaded onto Memory; therefore these are respective functional expressions to execute subsequent steps (810 through 830).

At step (810), candidate importance score anticipator (710) uses video frame to train video summarization network to anticipate the candidate. The anticipator (710), using convolution neural network trained by image dataset, extracts feature information from each video frame; using the feature information, anticipator can train video summarization network. Anticipator (710) can output candidate importance score, which is interpolated in importance score—which is frame selection probability to select a set of frames to summarize video, using video summarization network's output data.

At step (820), selection probability obtainer (720) interpolates anticipated candidate importance scores to obtain a frame selection probability of each frame of the video. Obtainer (720), based on sequence input size of video frame, aligns each candidate importance score in equal distance, uses piecewise linear interpolation to interpolate candidate scores to importance score, and obtains frame selection probability of each frame of the video. Obtainer (720), after interpolating importance candidate score to importance score, uses a Bernoulli distribution to convert frame selection action which is either 0 or 1 (used to select keyframe) to frame selection probability, and then selects any frame with frame selection probability of 1. Obtainer (720), using a Bernoulli Distribution to convert to a frame selection probability, samples frame selection action, and uses a reward function to evaluate representativeness of the video summarization produced by the frame selection action, and obtains video frame action's log probability and reward. Obtainer (720), using reward and log probability of frame selection action, can calculate an objective function as suggested by underappreciated reward. Obtainer (720), in order to train a parametrized policy, can use a search strategy to search any underappreciated reward method, as well as a policy gradient method.

At step (830), summarization generator (730), based on obtained frame selection probability, can generate a video summarization using the set of selected frames. Generator (730), in order to promote summarization's representativeness, trains the video summarization network by using reconstruction loss modified by random masking.

The above-mentioned device can be implemented through hardware component, software component and/or a combination of hardware components and software components. For example, devices as well as components explained in illustrations can utilize processor, controller, ALU (Arithmetic Logic Unit), DSP (Digital Signal Processor), microcomputer, FPGA (field programmable gate array), PLU (Programmable Logic Unit), microprocessor, or any other device including one or multiple all-purpose or special-purpose computer, capable of executing and responding to instructions. Processor can execute OS as well as one or multiple software applications run on the OS. Also, processor can respond to software's execution and can approach, store, modify, process or generate data. To help understand, there can be cases where there is only a single processor, but a person with common knowledge in the industry can assume that processor can take on a multiple number of processing elements and/or multiple forms of processing elements. For example, processor can take on multiple processors; or singular processor and singular controller. In addition, other processing configurations such as parallel processing are possible as well.

In terms of software, the invention can include computer program, code, instructions, or a combination thereof, and it can be freely configured and can independently or collectively command the processor. Software and/or data can be interpreted by the processor or in order to offer a set of commands or data to processors, software and/or data can be embodied within some type of machine, component, physical device, computer storage medium or device. Software can be spread throughout network-enabled computer system and can be stored and executed in such a dispersed fashion. Software and data can be stored in one or more computer-readable device.

The invention's method according to the embodiments can be implemented through programming command types executed by various computing means and can be recorded on a computer readable medium. At this point, medium can permanently store computer executable programs or temporarily store for execution or download. Also, medium can take the form of one or multiple hardware combinations, being able to record or store. The medium does not limit itself to a medium directly accessible to computing system and can take on variance throughout a network. Examples of medium can include magnetic media like hard disk, floppy disk and magnetic tape; optical recording mediums like CD-ROM and DVD; magneto-optical medium like floptical disk; mediums like ROM, RAM and Flash Memory that are composed of programming commands. Also, as examples of another form of medium, it can include recording or storing mediums managed by app stores (that distributes applications), or websites or servers that distributes or supplies various software.

As such, the above illustrations were described on a limited capacity but for an individual with common knowledge in the relevant industry can modify the illustrations on a various level. For example, even if the technology is implemented in a different order than what is written above and/or the described components like system, structure, equipment, circuits are combined or associated in a different manner that what is written above and/or are substituted or replaced by other components or equivalents, it can result in proper outcome at the end.

As such, other implementations and illustrations that are equal to the scope of the patent's claim, will fall within the realm of the following patent claim scope.

What is claimed is:

1. A method for video summarization, comprising:
   anticipating, by a video summarization network, a candidate importance score by training of the video summarization network using a set of video frames in a video;
   interpolating the candidate importance score with respect to other candidate importance scores in the video in order to generate a frame selection probability for each frame of the video; and
   generating a video summarization that includes a set of selected frames based on the generated frame selection probability,
   wherein the anticipating further includes extracting characteristic information each video frame of the set of video frames using a convolutional neural network trained by image data set, and
   wherein the extracted characteristic information is used to train the video summarization network.

2. The video summarization method of claim 1, wherein the video summarization network is an unsupervised video summarization network with piecewise linear interpolation.

3. The method of claim 2, wherein the anticipated candidate of importance score that is interpolated in the importance score of the frame selection probability in the video summarization of the video frame is generated by video summarization network output data.

4. The method of claim 1, the generating further including:
   training a parametrized policy-type search strategy to perform a search using an underappreciated reward method as well as policy gradient method.

5. The method claim 1, the generating of the video summarization further including:
   promoting representativeness of the video summarization by revising Reconstruction Loss using random masking to train the video summarization network.

6. A method for video summarization, comprising:
   anticipating, by a video summarization network, a candidate importance score by training of the video summarization network using a set of video frames in a video;
   interpolating the candidate importance score with respect to other candidate importance scores in the video in order to generate a frame selection probability for each frame of the video; and
   generating a video summarization that includes a set of selected frames based on the generated frame selection probability,
   wherein the candidate importance scores are aligned at equal space based on a sequence input size of the video frame,
   wherein the aligned candidate importance scores are interpolated using piecewise linear interpolation, and
   wherein the frame selection probability of each frame of the video is generated by applying the piecewise linear interpolation.

7. The method of claim 6, the gaining further including:
   using, after the importance scores are interpolated, a Bernoulli Distribution in order to select the keyframe, such that the frame selection actions are converted to a frame selection probability, ranging from 0 to 1, wherein the converted frame selection probability therefore selects a frame with probability of 1.

8. The method of claim 7, the gaining further including:
   sampling the frame selection action for the frame selection probability which have been converted using the Bernoulli Distribution;
   evaluating, using a reward function, representativeness of a video summarization generated by the frame selection action of the video frame;
   acquiring a log probability and a reward function of the video frame action; and
   summarizing the original video using the video summarization,
   wherein the reward function includes a representativeness reward as well as a diversity reward,
   wherein the diversity reward uses characteristic information of the video frame to measure a difference between selected frames; and
   wherein the representative reward measures a similarity between the characteristic information of the selected frame and other characteristic information corresponding to every frame in the original video.

9. The method of claim 8, the generating further including:
   using a reward and a log probability on the frame selection action of the video frame, wherein an objective function is calculated at underappreciated reward.

10. A video summarization system, comprising:
    a memory medium comprising instructions;
    a bus coupled to the memory medium; and
    a processor coupled to the bus that when executing the instructions causes the system to:
      anticipate a candidate importance score by training of the video summarization network using a set of video frames in a video;
      interpolate the candidate importance score with respect to other candidate importance scores in the video in order to generate a frame selection probability for each frame of the video; and
      generate a video summarization that includes a set of selected frames based on the generated frame selection probability,
      wherein the anticipating further includes extracting characteristic information each video frame of the set of video frames using a convolutional neural network trained by image data set, and wherein the extracted characteristic information is used to train the video summarization network.

\* \* \* \* \*